United States Patent [19]

Kordel

[11] Patent Number: 5,839,372
[45] Date of Patent: Nov. 24, 1998

[54] LOAD HANDLING TROLLEY

[75] Inventor: Wojciech Joseph Kordel, Cheshire, England

[73] Assignee: Joloda (International) Limited, Liverpool, United Kingdom

[21] Appl. No.: 423,334

[22] Filed: Apr. 14, 1995

[30] Foreign Application Priority Data

Apr. 27, 1994 [GB] United Kingdom ................... 9408312

[51] Int. Cl.⁶ .................................................. B61B 12/00
[52] U.S. Cl. ............................................................ 104/307
[58] Field of Search ............................. 104/138.1, 138.2, 104/139, 162, 307, 135–140; 414/525 B; 198/774, 766, 801, 802; 15/98, 246

[56] References Cited

U.S. PATENT DOCUMENTS

| | | | |
|---|---|---|---|
| 1,471,217 | 10/1923 | Steiert | 15/98 |
| 1,547,115 | 7/1925 | Grant | 15/98 |
| 2,397,707 | 4/1946 | Travis | 15/98 |
| 3,091,477 | 5/1963 | Johnstone | 280/46 |
| 3,420,358 | 1/1969 | Iversen | 198/219 |
| 4,091,492 | 5/1978 | Thompson | 15/246 |
| 4,655,141 | 4/1987 | Gillson | 104/307 |

*Primary Examiner*—Robert J. Oberleitner
*Assistant Examiner*—C. T. Bartz
*Attorney, Agent, or Firm*—Seidel, Gonda, Lavorgna & Monaco, P.C.

[57] ABSTRACT

A load handling trolley for use on a channeled track is provided that includes an elongate load engager and bogies. The load engager is raisable and lowerable relative to the bogies via a ramp and rollers when the bogies are caused to move longitudinally relative to the load engager. Relative movement is controlled by a lever operated crank which is pivotally mounted with respect to the elongated load engager and which operates links pivotally connected between the crank and the bogey chassis. An abutment is operable between the links and the bogey chassis to limit the angular movement between the links and the bogey chassis. This permits the raising of the load engager when an end thereof partially projects beyond the end of the channeled track. Additional angular movement of the lever operated crank beyond that required to attain the limit position is allowed for by relieving an end plate of the trolley. A cleaning pad can also be positioned at the load and trailing ends of the trolley to provide cleaning of the full width of the channeled track.

13 Claims, 2 Drawing Sheets

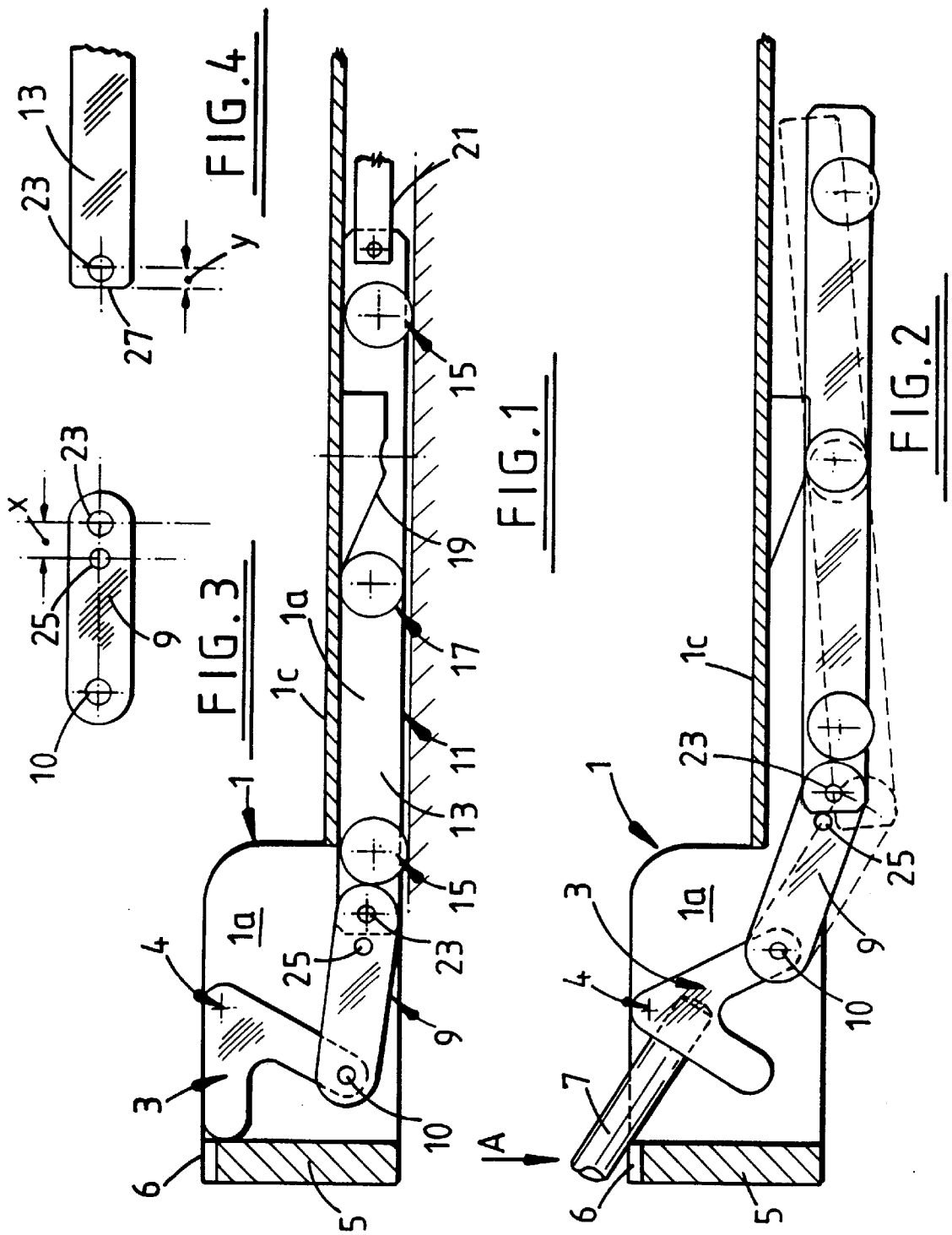

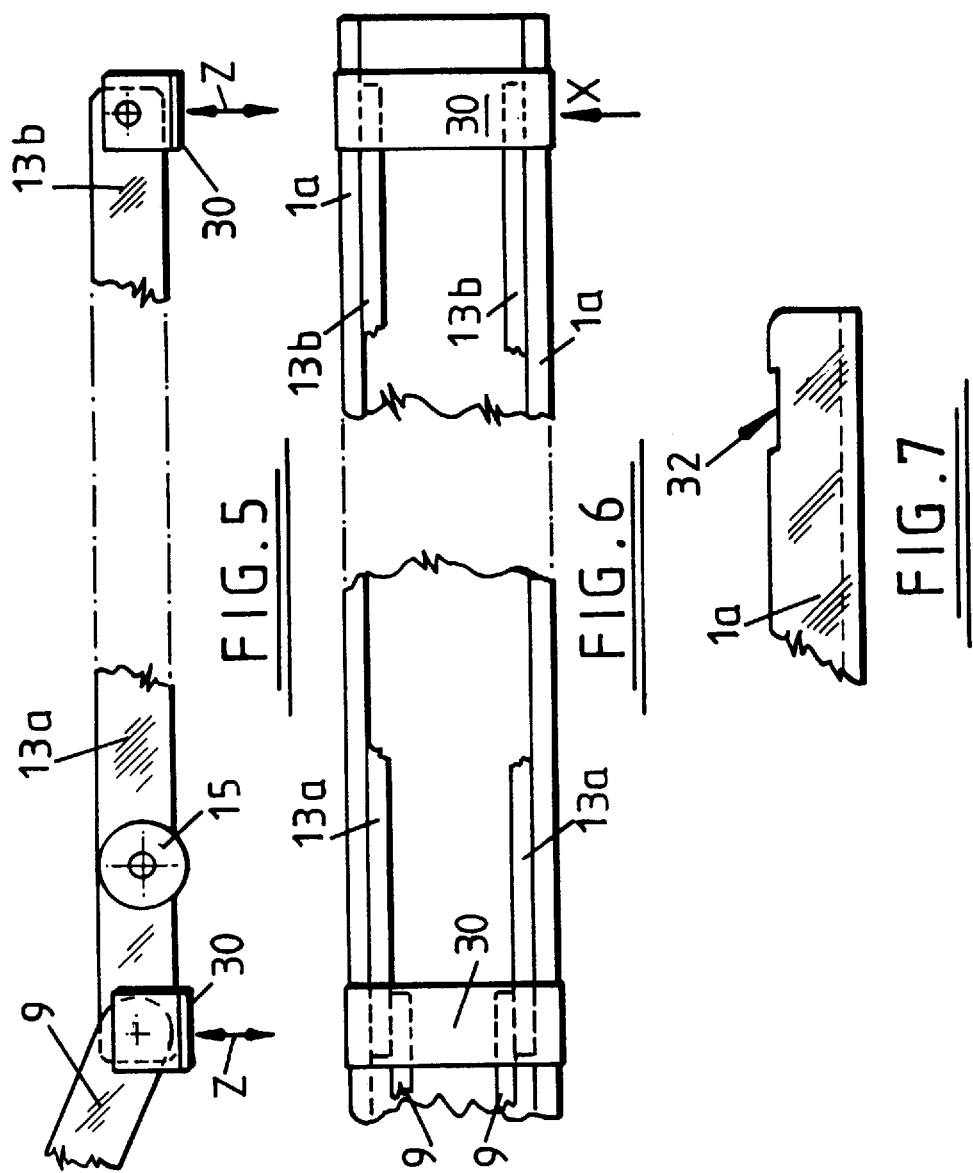

LOAD HANDLING TROLLEY

FIELD OF THE INVENTION

The invention relates to load handling trolleys of the type that normally run in channelled tracks and comprise elongate load engagers raisable and lowerable relative to bogies via ramp and roller means when the engager and the bogies are caused to move longitudinally relative to each other.

BACKGROUND OF THE INVENTION

Known examples of such trolley-in-track systems are available from the applicants under the Registered Trade Mark JOLODA.

The length of the trolley is ideally chosen to suit the size of load to be moved. In the event that too long a trolley is used a situation can arise where part of the trolley projects beyond the end of the track in which it to be used so that at least an end most roller of one bogey (usually there are three bogey assemblies per trolley) no longer engages the track. In such a situation with the current design of trolley operation of the lever which controls longitudinal displacement of the bogies relative to the elongate load engager is not effective to raise the elongate load engager.

It is an aim of the present invention to overcome this problem.

SUMMARY OF THE INVENTION

Accordingly, the present invention provides a load handling trolley comprising an elongate load engager raisable and lowerable relative to bogies via ramp and roller means when the bogies are caused to move longitudinally relative to the elongate load engager, movement of the bogies being controlled by a lever operated crank which is pivotally mounted with respect to the elongate load engager and which operates link means pivotally connected between the crank and a bogey chassis, and wherein an abutment is operable between the link means and the bogey chassis to limit the angular movement between the link means and the bogey chassis, and wherein additional angular movement of the lever operated crank is required to attain the limit position and this is allowed for by relieving an end plate of the trolley to allow further angular movement of the crank actuating lever.

Usually the trolley has three bogies which are interconnected by a respective actuating link. The need for further angular movement becomes necessary and hence the abutment becomes operative in the event that the lever is operated when at least part of the bogey overhangs the end of the track (ie. when the unit projects beyond the end of the track) and ensures that movement of the lever is transmitted to longitudinal movement of the bogies relative to the load engager to an extent sufficient to give the desired lifting action rather than resulting in angular movement between the link and the bogey chassis which has the effect of preventing the desired lifting action.

The abutment can be provided by appropriately positioned pin means on the link means and cooperable with an end of a or a respective bogey chassis side plate. The chassis preferably comprises a pair of laterally spaced side plates between which are disposed track rollers and pivot rollers and the link means comprises a pair of laterally disposed members which connect with the respective side plates. Preferably both of the pair of laterally disposed members of the link means is provided with said pin means.

Load handling trolleys are used in dirty environments which tends to build up of dirt within the channel track. The leading end of current trolleys are provided with an emergency lowering mechanism which also contacts the track over the width contacted by the bogey rollers to perform a track cleaning function at the leading end of the trolley. The presence of the elongate load engagers outwardly of the bogey chassis has heretofore precluded widthwise extension of the cleaner to cover the full width of the track. Furthermore, the device has no action in the reverse direction and thus debris can still encroach into the area of the rollers affecting their operation.

It is an aim of another aspect of the present invention to overcome the above problems.

Accordingly, another aspect of the invention provides a load handling trolley comprising an elongate load engager comprising a pair of downwardly extending side rails and raisable and lowerable relative to bogies via ramp and roller means when the bogies are caused to move longitudinally relative to the elongate load engager, and further comprising cleaning means adjacent the leading and trailing ends of the trolley which extend transversely substantially the full width of the track in which the trolley is operable and wherein the side rails of the elongate load engager are relieved to accommodate the ends of the cleaning means.

The track cleaning means conveniently comprises two blocks or pad-like members carried from the bogies. Preferably a plastics material is used. Preferably these are mounted for limited vertical movement with respect to the bogies. The recessing in the side rails of the elongate load engager accommodates the end regions of the cleaning pads in the lowered position of the engagers.

The full track width pads ensure that the entire width of the path is cleaned and by providing pads to the leading and trailing ends of the trolley, the bogies which are positioned between the pads are kept free from debris.

BRIEF DESCRIPTION OF THE DRAWINGS

The above aspects of the present invention will now be described further, by way of example only, with reference to the accompanying drawings, in which:

FIG. 1 is a diagrammatic partially sectioned side view of part of a load handling trolley in the lowered position, FIG. 2 is a view corresponding to FIG. 1 but showing the effect of moving the actuating lever to a raised position according to the present invention in solid outline and according to the prior art construction in dotted outline, FIG. 3 is a side view of the bell crank link as used in FIGS. 1 and 2, FIG. 4 is the end part of the bogey side rail as illustrated in FIGS. 1 and 2, FIG. 5 is a fragmented side view of the bogies of a load handling trolley incorporating track cleaning means, FIG. 6 is an underneath plan view of part of a load handling trolley showing the elongate load engager and the associate bogies, and FIG. 7 is a side view of the load engager viewed on X of FIG. 6.

DETAILED DESCRIPTION OF THE INVENTION

Referring firstly to FIGS. 1 to 4, a load handling trolley comprises an elongate load engager 1 having a pair of side plates 1a and connected by a load supporting platform 1c. A bell crank 3 is pivotally connected between the side rails 1a to pivot about axis 4 to be movable between the positions illustrated in FIG. 1 and that shown in FIG. 2. The side rails 1a are also connected by an end wall 5 which has a notch 6 cut in its upper surface permitting increased pivotal movement of an operating lever 7 which engages with the bell crank 3. Pivotally connected at axis 10 to the bell crank are a pair of laterally spaced bell crank links 9. One bogey assembly 11 of the load handling trolley is illustrated and comprises a pair of bogey chassis side plates 13 between which are disposed two track engaging rollers 15 and a pivot roller 17. Carried from the underside of the elongate load engager is a ramp member 19. A link 21 pivotally connected to the end of the first bogey chassis connects with a second bogey chassis assembly (not illustrated). The pair of bell crank links 9 are pivotally connected to a respective bogey chassis side plate 13 by way of pivot pin connection 23. Each bell crank link carries a pivot pin 25 which acts as an abutment. The distance of the pivot pin 25 from the pivot axis of pin 23 in conjunction with the distance from the end of the side chassis plate 13 to the axis of pin 23 represented by dimensions x and y in FIGS. 3 and 4 respectively are critical to ensure correct operation of the mechanism which is described further hereinafter.

In FIG. 1 the mechanism is shown with the elongate load engager in its lowered position. When it is required to elevate the elongate load engager relative to the track the lever 7 is inserted in the bell crank and pivoted anti-clockwise in the illustrated embodiment to move the bell crank and thus displace the bogey 11 longitudinally by the action of the link 9. Where the rollers 15 are in contact with the track in normal operation of the load handling trolley a clearance remains between the pin 25 and the end surface 27 of the side rails 13. In the situation where the load handling trolley projects beyond the end of the track the absence of the abutment 25 would result in considerable angular displacement between the link 9 and the bogey chassis 11 as shown in dotted outline in FIG. 2. However, by providing the abutment pin 25 angular movement is constrained and therefore despite the fact that the end bogey roller 15 is not supported sufficient longitudinal movement is generated to give the desired lift by movement of the roller up the ramp member 19. Additional angular movement of the bell crank is required to achieve this position and therefore the end plate 5 is recessed as at 6 to allow further angular movement by way of the actuating rod 7.

Referring now to FIGS. 5, 6 and 7, a load handling trolley comprises integers as described previously, namely an elongate load engager comprising a pair of side rails 1a and two bogey assemblies 11a, 11b having side rails 13a, 13b each carrying a pair of track rollers and pivot roller as per the afore-described bogey assembly which is not described further hereinafter. The bogey assemblies fit within the side rails 1a as will be evident from the description hereinbefore. According to the invention two cleaning pads are provided to the leading and trailing ends of the load handling trolley with one carried by each of the pair of bogey assemblies. The cleaning pads 30, as can be seen from FIG. 6, extend the full width of the trolley, in fact slightly beyond the trolley frame, so as to clean into the corners of the track, ie. the full width of the track. To accommodate the extension of the cleaning pad beyond the side rails 13a, 13b, the side rails 1a of the elongate load engager are recessed as shown at 32 in FIG. 7 for the right-hand end of the trolley. The left-hand end is recessed similarly. The cleaning pad is carried from a generally U-shaped bracket and the side members have a floating connection with the bogey chassis side rails which permits between 1 and 2 mm of vertical float in the direction indicated by arrows Z. The cleaning pads operate to clean the track when the trolley is in both its raised and its lowered position. By providing leading and trailing cleaning pads the bogey assemblies between the pads are kept free from track debris and the pads act to provide self-cleaning of the track in which the load handling trolley is received.

Experiments have shown that for a standard 4 foot load handling trolley, actuation of the raising mechanism is when projection of the trolley is more than 220 mm from the end of the track fails to achieve the desired lifting action. In contrast with the abutment pins present elevation occurs when the load handling trolley projects from the end of the track by up to 440 mm.

What I claim is:

1. A load handling trolley comprising an elongated load engager raisable and lowerable relative to bogies via ramp and roller means when the bogies are caused to move longitudinally relative to the elongated load engager, movement of the bogies being controlled by a lever operated crank which is pivotally mounted with respect to the elongated load engager and which operates link means pivotally connected between the crank and a bogey chassis, and wherein an abutment is operable between the link means and the bogey chassis to limit the angular movement between the link means and the bogey chassis, and wherein additional angular movement of the lever operated crank beyond that required to attain the limit position is allowed for by relieving an end plate of the trolley to allow further angular movement of the crank actuating lever in the limit position, which further angular movement is translated to longitudinal movement of the bogies relative to the load engager.

2. A load handling trolley according to claim 1 wherein the trolley has three bogies which are interconnected by a respective actuating link.

3. A load handling trolley according to claim 1 wherein the abutment is provided by appropriately positioned pin means on the link means and cooperable with an end of the bogey chassis side plate.

4. A load handling trolley according to claim 3 wherein the chassis comprises a pair of laterally spaced side plates between which are disposed track rollers and pivot rollers and the link means comprises a pair of laterally disposed members which connect with the respective side plates.

5. A load handling trolley according to claim 4 wherein both of the pair of laterally disposed members of the link means is provided with said pin means.

6. A load handling trolley according to claim 1 further comprising cleaning means adjacent the leading and trailing ends of the trolley which extend transversely substantially the full width of the track in which the trolley is operable and wherein the side rails of the elongate load engager are relieved to accommodate the ends of the cleaning means.

7. A load handling trolley according to claim 6 wherein the track cleaning means comprises two blocks of pad-like members carried from the bogies and mounted for limited vertical movement with respect to the bogies.

8. A load handling trolley comprising an elongate load engager comprising a pair of downwardly extending side rails raisable and lowerable relative to bogies via ramp and roller means when the bogies are caused to move longitudinally relative to the elongate load engager, cleaning means adjacent the loading and trailing ends of the trolley which extend transversely substantially the full width of the track in which the trolley is operable, wherein the side rails of the elongate load engager are relieved to accommodate the ends of the cleaning means, and wherein the track cleaning means comprises two blocks or pad-like members carried from the bogies.

9. A load handling trolley according to claim 8 wherein movement of the bogies is controlled by a lever operated crank which is pivotally mounted with respect to the elongate load engager and which operates link means pivotally connected between the crank and the bogey chassis and in which an abutment is operable between the link means and the bogey chassis to limit the angular movement between the link means and the bogey chassis and wherein an additional angular movement of the lever operated crank beyond that required to attain the limit position is allowed for by relieving an end plate of the trolley to allow further angular movement of the crank actuating lever in the limit position, which further angular movement is translated to longitudinal movement of the bogies relative to the load engager.

10. A load handling trolley according to claim 8 wherein the blocks are a plastics material.

11. A load handling trolley according to claim 8 wherein the members are mounted for limited vertical movement with respect to the bogies.

12. A load handling trolley comprising:

an elongated load engager having an end plate and a ramp disposed thereon;

a lever operated crank pivotally mounted on the load engager;

a bogey assembly which allows the trolley to roll;

link means pivotally connecting the crank and bogey assembly such that rotation of the crank causes movement of the bogey assembly; and roller means carried by the bogey assembly and engageable with the ramp of for raising and lowering the load engager relative to the bogey assembly when the bogey assembly is moved longitudinally relative to the load engager by the rotation of the crank, the link means comprising an abutment which limits the degree of pivoting between the link means and the bogey assembly and which causes the load engager to move longitudinally relative to the bogey assembly after the pivot limit is reached, and the end plate having a recessed portion for permitting rotation of the crank beyond that required for the links means to reach the pivot limit.

13. The load handling trolley of claim 12, wherein the abutment is a pin disposed on the link means, and the bogey assembly further comprises a side plate, pin cooperating with an end of the side plate to limit the degree of pivoting between the link means and side plate.

\* \* \* \* \*